UNITED STATES PATENT OFFICE.

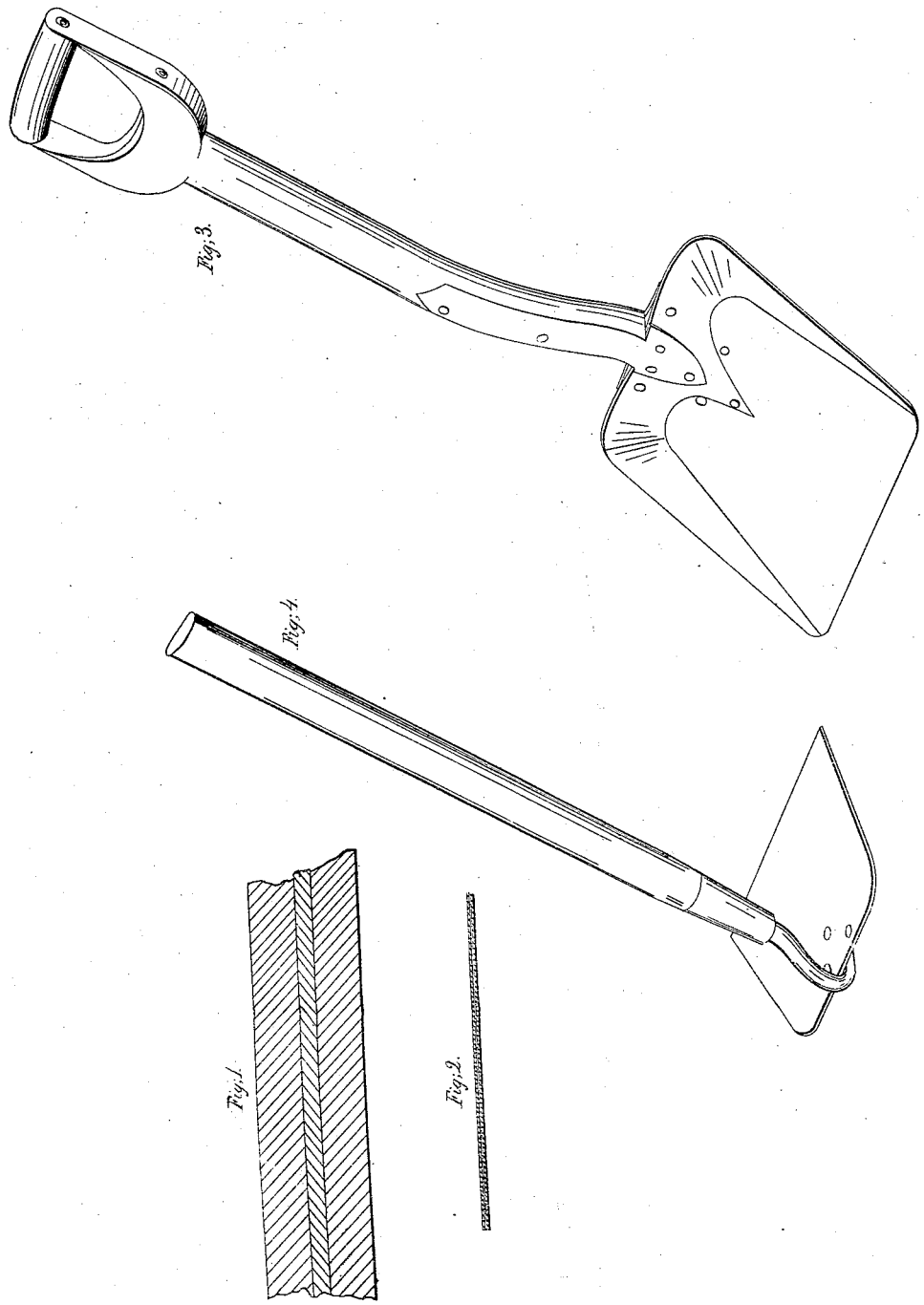

WILLIAM W. RICHARDS, OF PHILADELPHIA, PENNSYLVANIA.

MAKING SHOVELS, SPADES, &c.

Specification of Letters Patent No. 10,160, dated October 25, 1853.

*To all whom it may concern:*

Be it known that I, WILLIAM W. RICHARDS, of the city and county of Philadelphia, in the State of Pennsylvania, have invented a new and useful manufacture, namely, shovels, spades, hoes, and other implements of a composite lamina of steel and iron, the former to give rigidity and maintain a hard and sharp edge, the latter to supply the requisite toughness and strength, of which the following is a full, clear, and exact description, reference being had to the accompanying drawings, which make part of this specification, and in which—

Figure 1 represents a pile composed of a slab or bar of steel between two of iron, ready to be heated and then extended between rollers to the proper thickness for the implement for which it is designed, and Fig. 2 represents a piece of the compound sheet when thus extended. Fig. 3 represents a shovel, and Fig. 4 a hoe made of the composite lamina.

Shovels and spades have usually been made either wholly of sheet iron or sheet steel cut into the proper shape by shears or otherwise; or they have been made by taking a piece of bar iron of suitable size, welding a piece of steel to it to form its cutting edge, then plating it out, and shearing it into the required shape. The plates thus formed constitute the body of the shovel which must be subsequently pressed to give it the required convexity and strapped, handled and finished.

A spade, shovel or hoe made of steel alone, is very liable to break under hard usage, especially at a line beneath the cofer or strap and this is usually called breaking its back, or if to guard against this accident, the plate be left too soft, its edge will bend so as to prevent it from penetrating freely earthy or other substances, and be very liable to clog, and its back will bend which is almost as bad as breaking.

To remedy these defects in implements as ordinarily made, is one of the principal objects of my invention which consists, in making them of a composite sheet of metal, whose constituents are steel and iron in parallel laminæ welded together. This composite sheet is formed, by taking a slab of steel and placing on one, or both sides of it, a slab of iron, these slabs thus arranged form what is called a "pile" which is first heated in a suitable furnace to a welding heat, and is then hammered or rolled into sheets in the same manner that a pile of iron is usually reduced to sheets.

Shovels and other implements and tools made from a composite sheet of this kind, bear much harder usage, and are much more durable than when made entirely of steel, for as the steel can be tempered much harder without liability to break when thus supported by the iron, than when not so supported, the cutting edge of the implement will wear longer than if made of steel alone; it will also remain sharper because the iron wearing the fastest, will leave the thin lamina of steel protruding far enough to form an edge as thin and sharp as it is desirable to have. Moreover the back will possess both stiffness and toughness, &c., that it will not be liable to either bend or break. Shovels, spades, hoes, and other implements are made by shearing from the sheet of this composite metal, and then subjecting it to all other processes and manipulations that similar implements are subjected to when made of sheet steel.

When one of the sides of any implement is required to be made smooth and hard, the sheet of which it is made should be composed of two laminæ only, one of iron, and the other of steel.

I deem a more detailed description of the manufacture of the composite sheets of metal, and of the construction of shovels and other implements therefrom unnecessary, because in other particulars than those which I have described, those details are the same as are now generally practised in the manufacture of such implements from sheets of steel or iron alone.

I claim—

As a new manufacture, shovels, spades, and other implements, made of a composite sheet of metal, whose constituents are parallel laminæ of unequal hardness as herein set forth. But I make no claim to such implements made of the hard lamina extending for a short distance only above the edge, but only where it extends up beneath the strap to support the back.

In testimony whereof I have hereunto subscribed my name.

WILLIAM W. RICHARDS.

Witnesses:
 THOS. C. WOOD,
 W. H. WALLACE.